US012679560B2

(12) United States Patent
Scholler et al.

(10) Patent No.: US 12,679,560 B2
(45) Date of Patent: Jul. 14, 2026

(54) METHOD FOR JOINING A WINDOW FRAME TO A FUSELAGE SKIN OF AN AIRCRAFT MADE OF A FIBER COMPOSITE MATERIAL

(71) Applicant: Premium Aerotec GmbH, Augsburg (DE)

(72) Inventors: Jochen Scholler, Augsburg (DE); Michiel Vrijbergen, Augsburg (DE)

(73) Assignee: Premium Aerotec GmbH, Augsburg (DE)

( * ) Notice: Subject to any disclaimer, the term of this patent is extended or adjusted under 35 U.S.C. 154(b) by 95 days.

(21) Appl. No.: 18/678,204

(22) Filed: May 30, 2024

(65) Prior Publication Data

US 2024/0400226 A1     Dec. 5, 2024

(30) Foreign Application Priority Data

Jun. 1, 2023    (DE) .......................... 102023114402.2

(51) Int. Cl.
| *B64F 5/10* | (2017.01) |
| *B64C 1/00* | (2006.01) |
| *B64C 1/14* | (2006.01) |

(52) U.S. Cl.
CPC .............. *B64F 5/10* (2017.01); *B64C 1/1484* (2013.01); *B64C 2001/0072* (2013.01)

(58) Field of Classification Search
None
See application file for complete search history.

(56) References Cited

U.S. PATENT DOCUMENTS

| 2009/0148647 | A1* | 6/2009 | Jones .................... B29C 70/545 |
| | | | 156/159 |
| 2011/0277924 | A1* | 11/2011 | Bense ................... B64C 1/1492 |
| | | | 156/245 |
| 2013/0084434 | A1 | 4/2013 | Kehrl et al. |
| 2016/0176085 | A1 | 6/2016 | Brok et al. |
| 2018/0290403 | A1 | 10/2018 | Hasan et al. |
| 2019/0135405 | A1 | 5/2019 | Jörn et al. |
| 2020/0122411 | A1* | 4/2020 | Schulze ................ F16B 11/006 |

FOREIGN PATENT DOCUMENTS

| DE | 102017126052 A1 | 5/2019 |
| DE | 102018125979 A1 | 4/2020 |
| DE | 102019123866 A1 | 3/2021 |

* cited by examiner

*Primary Examiner* — Barbara J Musser
(74) *Attorney, Agent, or Firm* — Lerner David LLP

(57) ABSTRACT

A method for joining a window frame to a fuselage skin of an aircraft made of a fiber composite material, includes providing the window frame, making a window opening in the fuselage skin, arranging a curable connecting layer around the window opening, pressing the window frame onto the connecting layer, hardening the composite of fuselage skin, connecting layer and window opening.

7 Claims, 2 Drawing Sheets

METHOD FOR JOINING A WINDOW FRAME TO A FUSELAGE SKIN OF AN AIRCRAFT MADE OF A FIBER COMPOSITE MATERIAL

FIELD OF THE INVENTION

The invention relates to a method for joining a window frame to a fuselage skin of an aircraft made of a fiber composite material.

BACKGROUND OF THE INVENTION

Vehicles for transporting passengers usually have a hull with a passenger cabin formed therein, wherein the hull usually has windows through which passengers in the passenger cabin can look out. In order to provide windows, corresponding window openings are required, which are usually reinforced on the inside of the fuselage with a window frame in which the windows are arranged. Rivet joints are widely used to connect the frames to the fuselage. To realize these, the window frame and an edge area around the window opening are provided with rivet holes through which rivet connections are made between the two elements. Appropriate sealants are also provided between the window frame and the fuselage skin. Window frames can be integrated in this way both in aluminum fuselages and in fuselages made of fiber composites.

This type of connection is time-consuming and labor-intensive. As the riveted joints around a window opening are discrete, a connection and thus a load transfer between the window frame and the fuselage skin only occurs at certain points. The window frame and the edge area around the window opening are therefore usually sufficiently large and rigid to ensure sufficient strength via this punctual connection.

BRIEF SUMMARY OF THE INVENTION

It is a task of the invention to propose a method for connecting a window frame to a fuselage skin of an aircraft, which enables a sufficiently resilient connection, but with less effort.

A method is proposed for joining a window frame to a fuselage skin of an aircraft made of a fiber composite material, the method comprising providing the window frame, making a window opening in the fuselage skin, arranging a curable connecting layer around the window opening, pressing the window frame onto the connecting layer, hardening the composite of fuselage skin, connecting layer and window opening.

The core idea of the invention is to provide a preferably already cured window frame made of a fiber composite material, which is connected to the fuselage skin via a curable connecting layer. The composite of the fuselage skin, connecting layer and window frame is jointly subjected to a curing process, resulting in an integral component into which the window frame is integrated. According to the invention, the usually punctual connection between the window frame and the fuselage skin is thus replaced by a continuous, steady connection. The otherwise necessary processing steps for producing the connecting holes, deburring and cleaning the holes, inserting the sealant and finally inserting the connecting rivets are no longer necessary. The improved connection enables improved deformation behavior of the composite of fuselage skin and window frame, which ultimately means that the window frame can have a simplified structure and/or a simplified fiber alignment and/or shorter fiber lengths.

Providing the window frame can involve arranging several layers of a fiber composite material that have a matrix material and reinforcing fibers. Pre-impregnated fabrics or scrims can be used here, which are cut to size, laid on top of each other with the desired fiber patterns and bonded together under the effect of heat and pressure. Alternatively, it could also be possible to lay down individual fiber fabrics or scrims in cut form and apply the matrix material by means of a corresponding infusion process in order to subsequently carry out a curing process. Continuous fibers and/or shorter fibers or short fibers can be used.

The window opening in the fuselage skin can be produced using a suitable material removal process, such as milling, ultrasonic cutting, laser cutting, water jet cutting or similar. The fuselage skin of the aircraft may already be cured, pre-cured or not yet cured.

The curable connecting layer could have a matrix material as an active component that is compatible with the matrix material of the hull skin and/or the window frame. It could merely be applied to an edge surface around the window opening and/or to a surface of the window frame facing the hull skin. This process could be carried out by brushing, squeegeeing, spraying, rolling or the like. Alternatively, it could also be applied to the corresponding surface as an at least partially dimensionally stable layer. The latter could, for example, have a carrier made of a net-like, permeable or fully impermeable material that is provided with the matrix material.

The window frame pressed onto the fuselage skin thus encloses the connecting layer with the fuselage skin. The curing of the composite of the fuselage skin, connecting layer and window opening can be achieved by conventional methods, which usually involve the application of pressure and heat. This may involve an autoclave-based process. Subsequently, the window frame is an integral component firmly bonded to the fuselage skin.

It should be mentioned at this point that the matrix material could be a thermosetting resin. Alternatively, the matrix material could also be a thermoplastic, so that the effect of heat and possibly pressure results in a composite of the matrix material with reinforcing fibers, free of air pockets, which is connected to the window frame via the connecting layer.

In an advantageous embodiment, the window frame is hardened before being pressed on. The window frame can be manufactured using a process independent of the fuselage skin and/or procured as a purchased part. The manufacturing process for producing the window frame may well differ from that of the fuselage skin, for example in order to realize more complex fiber patterns. It is advisable to create a joining surface to be connected to the fuselage skin that can be pressed flush onto the connecting layer. The matrix material used in the window frame is preferably compatible with the connecting layer or corresponds to a matrix material provided in the connecting layer.

In an advantageous embodiment, the method further comprises applying a vacuum film to the hull skin and the window frame, and evacuating an area covered by the vacuum film before the bond hardens. The evacuation exerts a force on the composite of window frame, connecting layer and fuselage skin so that the pressing-on can take place. A press-on body can also be placed between the vacuum film and the window frame, which controls, locally reinforces and/or redirects the press-on force. The vacuum film can also be used for matrix infusion if at least part of the torso skin is to be produced using a vacuum infusion process. In this case, infusion openings are provided through which a corresponding matrix material is introduced.

In an advantageous embodiment, the connecting layer is arranged on a carrier material and can be adhered to the window frame or the fuselage skin over a large area. The connecting layer is thus realized as a type of adhesive film or adhesive foil, which has a curable, in particular thermosetting adhesive in the form of the matrix material. The resulting bond between the window frame and the fuselage skin is therefore permanent. The carrier material can comprise polyester.

In an advantageous embodiment, the fuselage skin and/or the window frame is not yet fully cured before the composite is cured. When the method according to the invention is carried out, the connecting layer is cured at the same time as the fuselage skin is fully cured by, i.e. the fuselage skin and the window frame are cured together ("co-curing" or "co-bonding").

In an advantageous embodiment, the window opening is created using an ultrasonic process. In particular, this can take the form of an ultrasonic blade cut, which results in a precise cut with clean edges. This cutting method is particularly suitable for cutting prepregs or another arrangement of fibers and matrix material where curing has not yet taken place.

In an advantageous embodiment, the window frame is connected to the fuselage skin over its entire surface. The window frame has a contact surface that is brought into full, flush, material-to-material contact with the fuselage skin, resulting in a particularly strong, highly resilient connection.

In an advantageous embodiment, no mechanical connecting elements are inserted through the window frame and the fuselage skin. The material-locking connection eliminates the need to attach punctual connecting elements, which improves the mechanical deformation behavior.

In an advantageous embodiment, curing is carried out using an autoclave process.

In an advantageous embodiment, a tear-off fabric is attached to the not yet fully cured window frame or the not yet fully cured fuselage skin, which is removed before pressing on. The surface after the tear-off has reproducible properties and improves the bond to the curable connecting layer.

One advantage of this is that the construction can be made lighter with less weight. The window frame, which is connected via a connecting layer, provides better boundary conditions for the connection to the (outer) skin of the aircraft. The onset of buckling occurs at a higher load level. The construction can therefore be made lighter.

BRIEF DESCRIPTION OF THE DRAWINGS

In the following, the enclosed drawings are used to describe embodiments in more detail. The illustrations are schematic and not to scale. Identical reference signs refer to identical or similar elements. It shows.

DETAILED DESCRIPTION

Figure 1A:
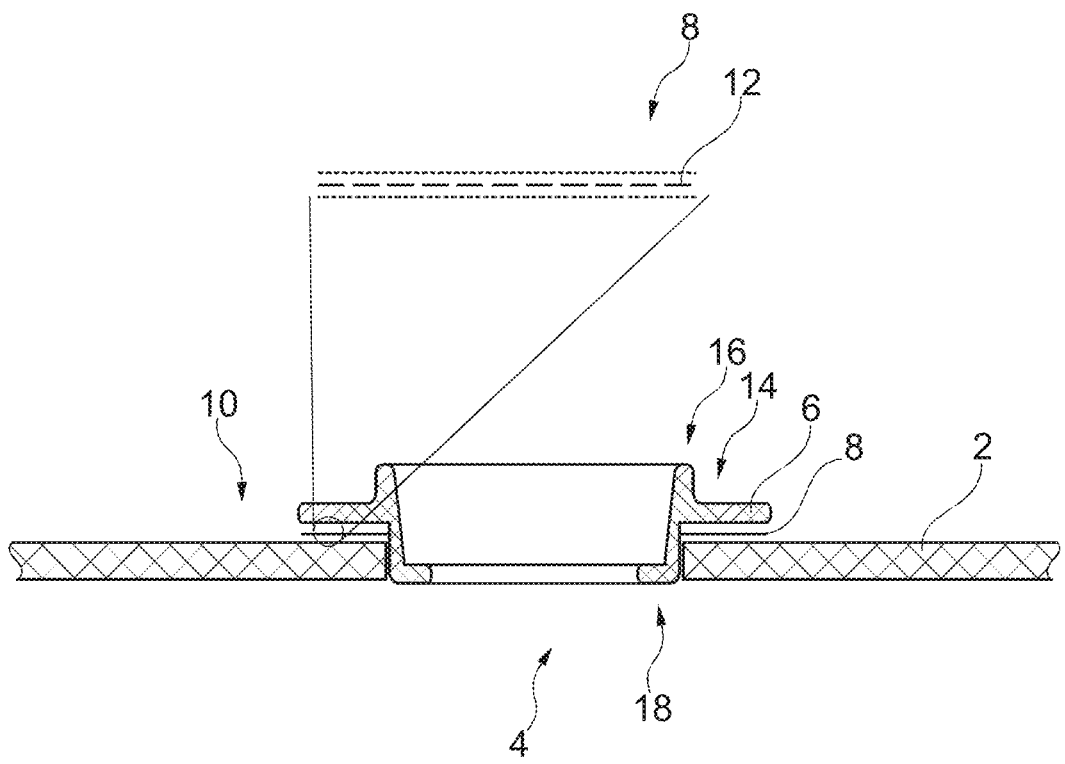
FIGS. 1a and 1b schematically show the connection of a window frame to a fuselage skin with (FIG. 1a) and without (FIG. 1b) a carrier material.

FIG. 1 shows a fuselage skin 2 with a window opening 4 arranged therein. An already cured window frame 6 made of a fiber composite material is provided and inserted into the window opening 4. A connection between the window frame 6 and the fuselage skin 2 is made by means of a curable connecting layer 8, which surrounds the window opening 4 on an inner side 10 of the fuselage skin 2 and is flush with the fuselage skin 2 and the window frame 6. The composite of the fuselage skin 2, connecting layer 8 and window frame 6 is subjected to a joint curing process, resulting in an integral component into which the window frame 6 is integrated. The connection between the components is continuous, which improves the deformation behavior of the composite and enables a simplified structure and/or simplified fiber alignment and/or shorter fiber lengths in the window frame 6.

The variant of the compound layer 8 shown in FIG. 1a is arranged on a carrier material 12, which comprises, for example, one or more layers of material comprising polyester. The connecting layer can be arranged on both sides of the carrier material 12. Before attaching the window frame 6, the carrier material 12 can be cut to size and stuck onto the fuselage skin 2 like a sticker in order to subsequently press on the window frame 6.

In the exemplary embodiment shown, the window frame 6 has an outer flange 14, which is placed on an edge area of the fuselage skin 2, which surrounds the window opening 4. The outer flange extends radially outwards. On the inside, an inner circumferential bar 16 is provided, which extends axially inwards from the outer flange, i.e. inwards from the window opening 4 (upwards in the plane of the drawing). An outer circumferential bar 18 is arranged in the opposite direction, which extends axially outwards and is largely flush with the fuselage skin 2.

Figure 1B:
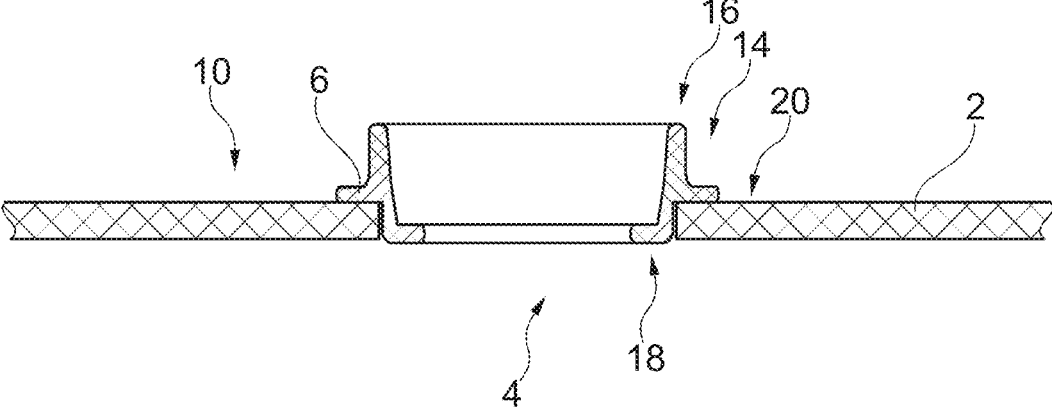

FIG. 1b shows the same window frame 6, which has a connecting layer 20 that is attached to the window frame 6 and/or the fuselage skin 2 without the carrier material 12. This is only shown schematically and does not practically lead to a change in the thickness of the structure.

Figure 2:
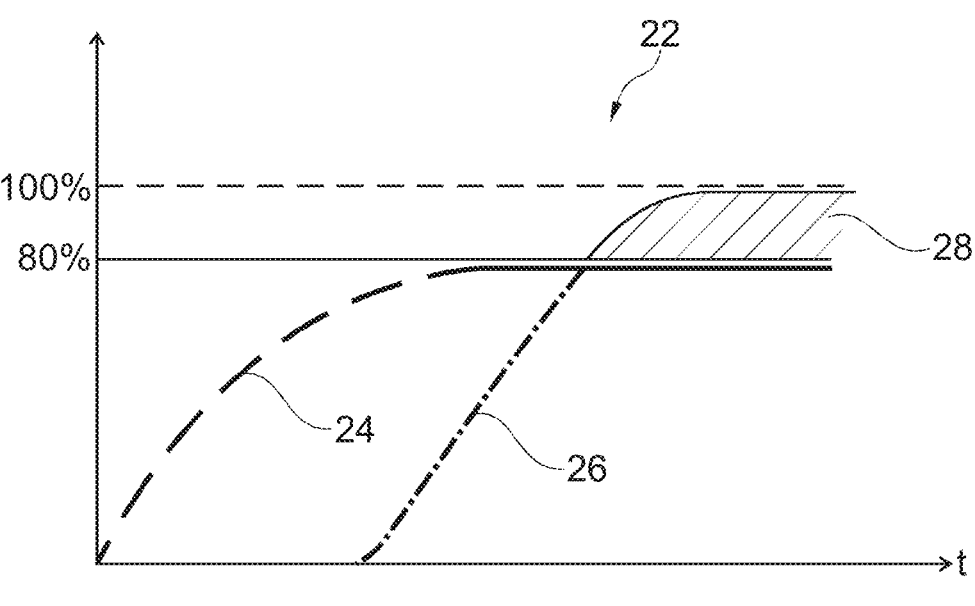
FIG. 2 shows a schematic diagram of the curing of the composite.

FIG. 2 shows a schematic curing diagram 22, which illustrates the curing of the composite. The abscissa represents the curing time, while the ordinate shows the degree of curing in %. Two different options are disclosed in FIG. 2. In a first option, the window frame 6 and/or the fuselage skin 2 is pre-cured, for example 80% cured, as indicated by line 24. This can be achieved by applying pressure and heating accordingly, for example in an autoclave. Subsequently, the window frame 6, the connecting layer 8 or 20 and the fuselage skin 2 can be brought into contact with each other and cured together, for example by further heating under pressure. As a result of the joint curing, an integral component can be produced using the curable connecting layer 8 or 20.

However, it is also possible to use a fully cured window frame 6, which is joined to the fuselage skin 2 by curing it with a not yet cured connecting layer 8 or 20. Curing takes place, as shown by line 26, up to a degree of curing of 100%. The energy required for this is represented by a cutting surface 28 between lines 24 and 26.

Figure 3:
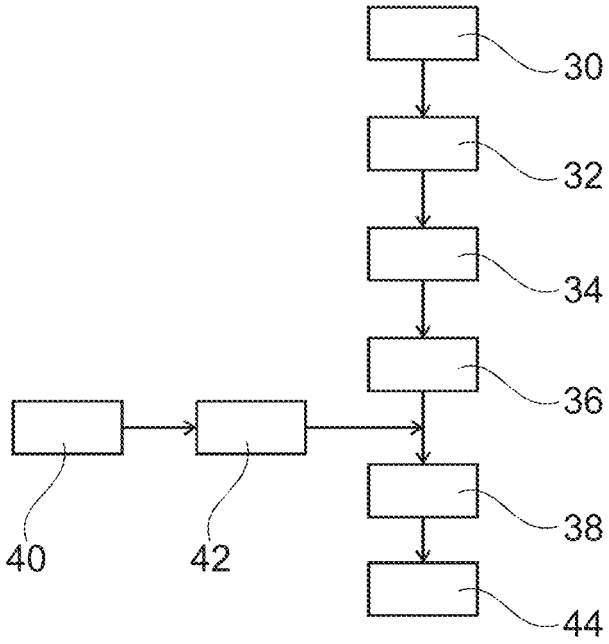
FIG. 3 schematically shows an additional fastening of the window frame.

FIG. 3 further shows a method for bonding a window frame 6 to a fuselage skin 2 of an aircraft made of a fiber composite material, the method comprising providing 30 the window frame 6, making 32 a window opening 4 in the fuselage skin 2, arranging 34 a curable connecting layer 8 or 20 around the window opening 4, pressing 36 the window frame 6 onto the connecting layer 8 or 20, curing 38 the composite of fuselage skin 2, connecting layer 8 or 20 and window opening 4. The production 32 of the window opening 4 could be carried out by means of guided cutting of the fuselage skin 2 using an ultrasonic cutting tool. The window frame 6 can be cured or not yet fully cured before pressing on 36. The fuselage skin 2 could also be cured or not yet fully cured before curing 38 of the composite. The connecting layer 8 could be arranged on a carrier material 12, so that the arrangement 34 can also include adhesion.

Before curing 38, a vacuum film can be applied 40 to the fuselage skin 2 and the window frame 6, then an area covered by the vacuum film can be evacuated 42. Preferably, the window frame 6 is fully bonded to the fuselage skin 2 by pressing on 36 and curing 38.

Furthermore, in addition to the connection by the connecting layer 8 or 20, it is conceivable to introduce mechanical connecting elements through the window frame 6 and the adjoining 44 fuselage skin 2. These could comprise rivets that are flush with the fuselage skin 2.

In addition, it should be noted that "comprising" or "comprises" does not exclude other elements or steps and "one" or "a" does not exclude a plurality. Furthermore, it should be noted that features or steps described with reference to one of the above embodiments may also be used in combination with other features or steps of other embodiments described above. Reference signs in the claims are not to be regarded as a limitation.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

LIST OF REFERENCE SYMBOLS

2 Fuselage skin
4 Window opening
6 Window frame
8 Curable compound layer
10 Inner side
12 Carrier material
14 Outer flange
16 Inner circumferential bar
18 Outer circumferential bar
20 Connecting layer
22 Curing diagram 24 80% line
26 100% line
28 Cutting surface
30 Providing the window frame
32 Making a window opening
34 Arranging a curable connecting layer
36 Pressing on the window frame
38 Curing the composite
40 Applying a vacuum film
42 Evacuate covered area
44 Inserting of mechanical fasteners

The invention claimed is:

1. A method for joining an at least partially curable window frame to an at least partially curable fuselage skin of an aircraft made of a fiber composite material, the method comprising:

providing the at least partially curable window frame, making a window opening in the at least partially curable fuselage skin, arranging a curable connecting layer around the window opening, pressing the window frame onto the connecting layer, and co-curing the at least partially curable fuselage skin, the curable connecting layer and the at least partially curable window opening to form a composite, wherein the connecting layer is arranged on a carrier material and is configured to be adhered flat to the window frame or the fuselage skin, wherein the step of making the window opening is carried out by an ultrasonic method, and wherein no mechanical connecting elements are inserted through the window frame and the adjoining fuselage skin.

2. The method according to claim 1, wherein the window frame is at least partially cured before being pressed.

3. The method according to claim 1, further comprising applying a vacuum film to the fuselage skin and the window frame, and evacuating an area covered by the vacuum film before the step of curing the composite.

4. The method according to claim 1, wherein the fuselage skin and/or the window frame is at least partially cured before the composite is cured.

5. The method according to claim 1, wherein the window frame is connected to the fuselage skin over an entire surface of the window frame.

6. The method according to claim 1, wherein the curing is carried out by an autoclave process.

7. The method according to claim 4, wherein a tear-off fabric is attached to the at least partially cured window frame or the at least partially cured fuselage skin, which is removed before pressing on.

* * * * *